Figure 3:
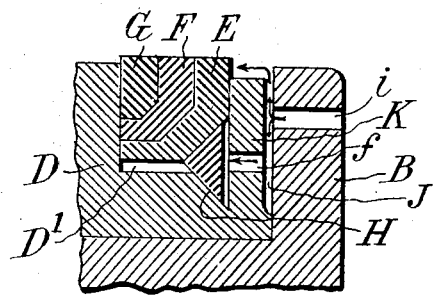

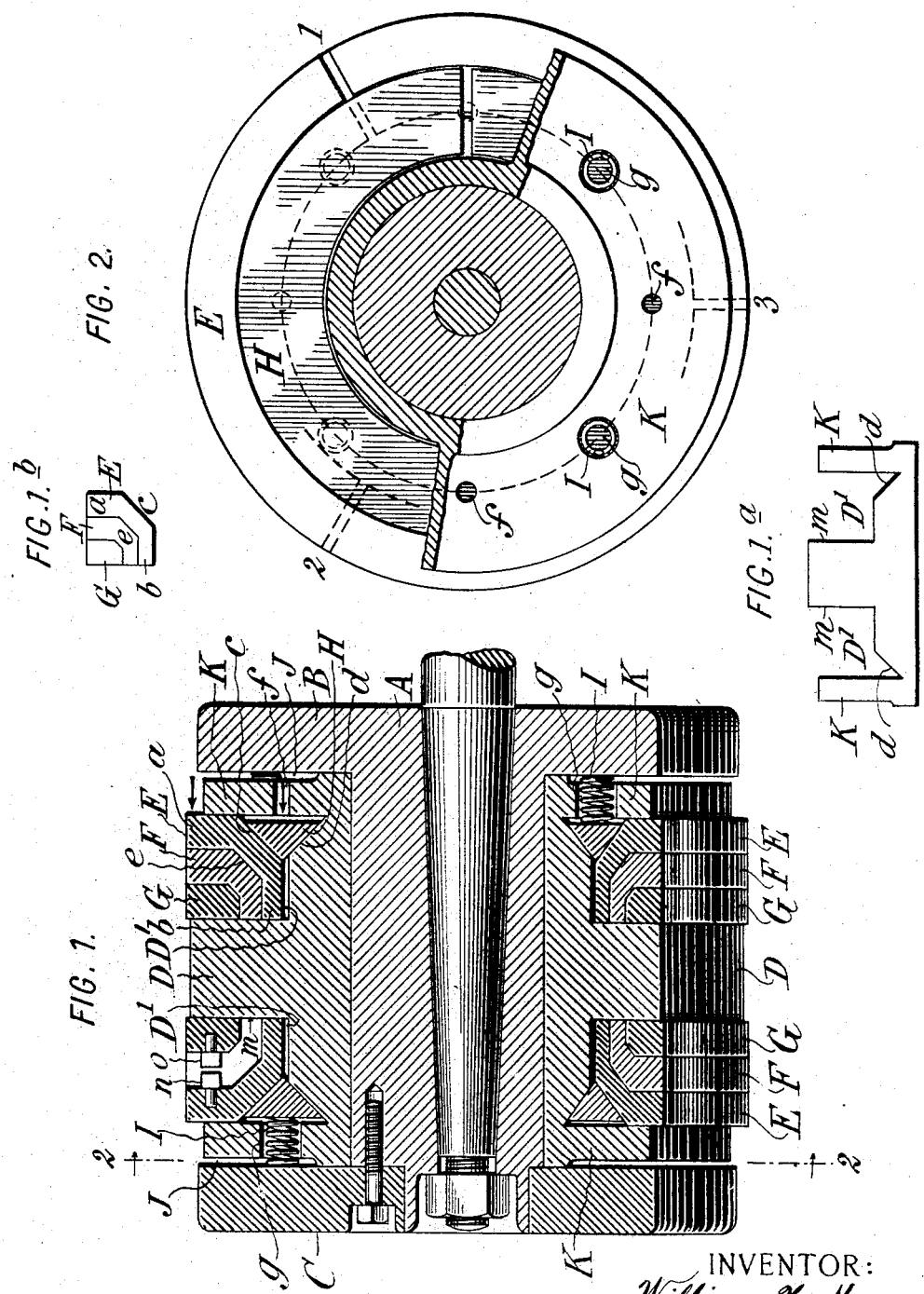

No. 765,033. PATENTED JULY 12, 1904.
W. H. MYERS.
PISTON PACKING.
APPLICATION FILED MAR. 7, 1903.
NO MODEL. 3 SHEETS—SHEET 2.

WITNESSES:
Fred White
Thomas Hollad

INVENTOR:
William H. Myers,

By Attorneys,
Arthur G. Fraser & Co.

No. 765,033. PATENTED JULY 12, 1904.
W. H. MYERS.
PISTON PACKING.
APPLICATION FILED MAR. 7, 1903.
NO MODEL. 3 SHEETS—SHEET 3.
FIG. 6.
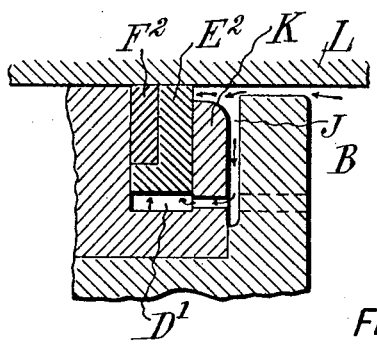
FIG. 7.
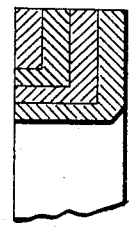
FIG. 8.
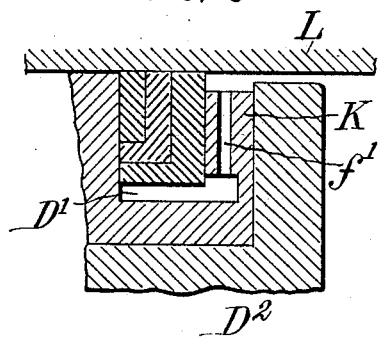
FIG. 9.  FIG. 10.
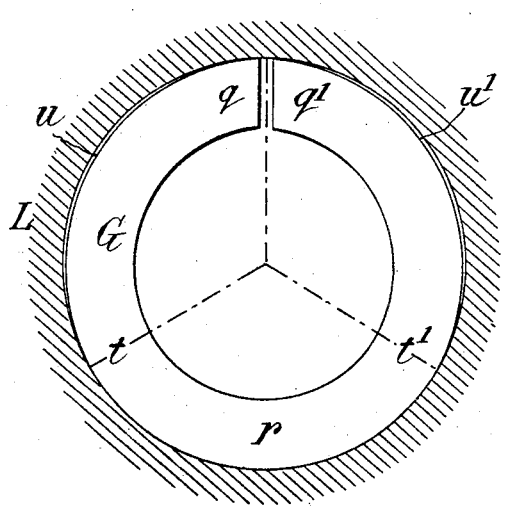
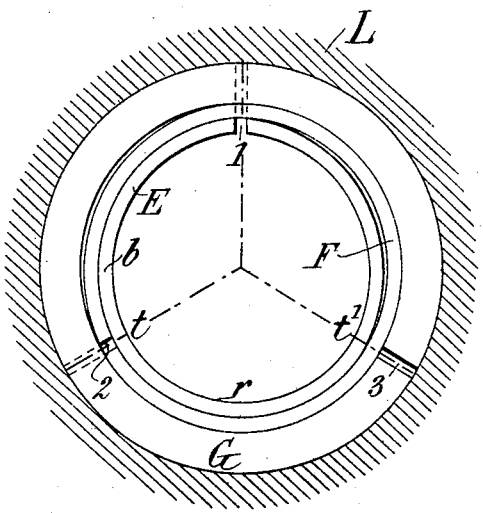
WITNESSES:
Fred White
Thomas Wallach
INVENTOR:
William H. Myers,
By Attorneys,
Arthur C. Fraser & Co.

No. 765,033.  
Patented July 12, 1904.

UNITED STATES PATENT OFFICE.

WILLIAM H. MYERS, OF NEW YORK, N. Y.

PISTON-PACKING.

SPECIFICATION forming part of Letters Patent No. 765,033, dated July 12, 1904.

Application filed March 7, 1903. Serial No. 146,636. (No model.)

*To all whom it may concern:*

Be it known that I, WILLIAM H. MYERS, a citizen of the United States, and a resident of the borough of Brooklyn, county of Kings, city and State of New York, have invented certain new and useful Improvements in Piston-Packings, of which the following is a specification.

This invention relates to piston-packings of the type in which a plurality of expansible metal rings are used and which being held in an annular groove or recess in the piston are pressed both forward and outward by the action of the steam or other fluid acting against the piston. It is customary to combine two rings, either split or segmental, so that each shall cover the splits or joints of the other, one ring being of L shape in cross-section and the other rectangular to fill the rabbet in the L-ring, the outer and advancing faces of the rings being adapted to make a close fit with the cylinder and with the perpendicular wall of the groove or recess in the piston. It is upon packings of this character that my present invention constitutes an improvement.

According to the preferred form of my invention the packing is composed of three split rings with their splits distributed approximately one hundred and twenty degrees apart, the outer ring being L-shaped, the middle ring a smaller L nesting within it, and the inner ring of shape to fill the rabbet in the middle one, all three rings being adapted to make a tight joint on their outer and advancing faces. The outer ring receives the steam-pressure both axially and radially and communicates it to the middle and thence to the inner ring. The rings are confined by a flange which is sufficiently smaller than the cylinder-bore to leave an annular space through which steam is admitted to press axially directly against the outer ring, the area thus exposed being sufficient to exert enough pressure to compact the rings together and press them to a tight fit on their advancing faces, but without pressing them so tightly on these faces against the wall of the piston as to prevent the outward or expansive action whereby the rings are pressed out to a tight fit with the cylinder. Steam is admitted through suitable passages to a space or annular chamber within the rings, whereby they are pressed outwardly to make a tight fit with the cylinder. For certain uses, and especially for large engines, the rings are adapted to receive pressure from an annular expander or wedging-ring, which is pressed up by springs to avoid any looseness or rattling, and in action it receives the pressure of the steam or other fluid in such direction as to press the rings together and expand them within the cylinder.

My invention also includes certain features of construction which will be hereinafter fully set forth.

Referring to the drawings, Figure 1 is an approximately diametrical section of a piston containing my improved packing. Fig. 1ᵃ is a diagrammatic view showing the contour of an axial section of the bull-ring, the upper part only being shown. Fig. 1ᵇ is a similar view of a cross-section of the packing-rings detached. Fig. 2 is a section taken partly on the line 2 2 in Fig. 1, the upper portion of the bull-ring flange being broken away. Fig. 3 is a detail view of a modification approximately in diametrical section. Figs. 4 to 8 are similar views of other modifications, and Figs. 9 and 10 are diagrammatic views illustrating the positions assumed by the packing-rings before being acted upon by fluid-pressure.

In order that the structure of my invention in its preferred form may be understood, I will first describe the construction with reference to Figs. 1, 2, and 3. These figures show a piston having two sets of packing-rings, as is usual in double-acting engines. For a single-acting engine, where the piston receives steam on only one side, a single set of packing-rings only is required. As the two sets are exact duplicates, a description of one will suffice for the two. Let A designate the piston, which has the usual radial flange or piston-head B, between which and the usual follower C is usually carried a bull-ring D, which serves to support the packing-rings and which, although not strictly necessary, is preferred for convenience of construction. The packing consists principally of a main ring E and a supplementary ring composed of one or more individual rings, two of which are shown, being marked F and G, respectively. The bull-ring is shown (see Fig. 1ª) as formed with grooves D' to receive the rings and their accessory parts. I prefer to use at least three rings in all, because by this means I attain great flexibility, which is a highly desirable feature in packings of this description. The main ring E is of substantially L shape in cross-section, being formed, as shown, (see Fig. 1ᵇ,) with a radial body or flange $a$ and an axial flange $b$, the body of the ring being preferably formed as shown, so as to provide an oblique face $c$, which forms a bearing-surface for an annular expander or wedging-ring H. This ring H is preferably split (see Fig. 2) to enable it to adjust itself to position, and it has an inclined face adapted to bear against the face $c$ of the ring E, and preferably has also a similar but reversely-inclined face to bear against a face $d$, formed on the bull-ring D at the bottom of the groove D'. To prevent any looseness or rattling, the expander H is pressed normally against its two bearing-faces $c$ and $d$ by spring I, arranged at intervals around the piston, the opposite ends of the springs bearing against the inner side of the flange B or C of the piston. The effect of the expander and its springs is hence to hold the packing-rings pressed up against the wall $m$ of the bull-ring and to press them outwardly into contact with the walls of the cylinder. This is useful in forming a preliminary packing for the piston to make it tight at starting and before the rings are pressed out by the steam.

It is not necessary that the expander H be formed with an inclined face upon both its outer and inner sides; but it is desirable, because by this construction the rings are moved outwardly a greater distance with a given movement of the expander than if the latter were formed with a flat face upon one of its sides. If the inclined face upon its outer side is omitted, the ring E may be formed without its face $c$; but when the parts are formed as in the preferred construction shown it is desirable that the side of the ring E opposite the face $c$ shall be of similar contour, so that the proper thickness may not be exceeded and the ring shall retain the necessary elasticity. This side of the ring is hence formed at $e$ with a degree of obliquity which corresponds to that of the bearing-face $c$, and the supplementary rings F and G are correspondingly shaped, so as to avoid any increase in thickness. As thus constructed the packing is as flexible and elastic as though the bearing-face $c$ were omitted and the two flanges of the ring E met at right angles.

To permit the pressure of the steam to be freely applied to the packing, so as to press it outwardly against the cylinder-walls, I may form passages at any suitable points in the piston and its bull-ring, so that the pressure is directed against the ring E; but I prefer the construction shown, which includes certain novel features now to be described.

The flange B of the piston (and the follower C) is customarily formed of slightly smaller diameter than the bore of the cylinder, and I avail myself of this fact in my present invention. To replace a worn or broken packing, it has heretofore been customary to remove the cylinder-head and measure the bore of the cylinder, length of piston, &c., and from these measurements to build a new bull-ring and packing at the factory, so that when complete they may be substituted for the old packing with only a brief loss of time to the engine. When an old-style packing has been replaced with a modern packing in which the pressure on the rings is applied to the inner side thereof, it has been necessary to drill the piston flange and follower during the operation of fitting the new packings. This has required considerable loss of time to the engine. I avoid this in my present invention by forming a passage (or passages) for the steam, so that with an imperforate piston flange and follower free access is given to the inner side of the packing. In the construction shown this passage is formed in the bull-ring and is lettered J. As shown, it is formed as an annular groove or depression in the end of the bull-ring, the passage thus provided extending entirely around the latter, so that ample provision is made for the entrance of steam to the packing. The steam may flow through any suitable channels from the passage J, those shown being holes $f$, drilled through a radial flange K, which is preferably formed at each end of the bull-ring to hold the packing in approximately its proper position. The holes $g$, through which pass the springs I, also aid in conducting the steam through the flange K. The steam thus flowing from the cylinder may act directly against the inner sides of the packing-rings, (or in the construction shown the inner side of the main ring E;) but when the expander H is used its exposed side may receive the pressure of the steam with the same effect, this pressure being transmitted to the inner side of the rings to force them outwardly. In practice steam will flow to an extent through the split in the expander H, and thus press directly against the ring E, and, if desired, the expander may be made in a suitable number of sections or be perforated or otherwise formed to provide additional passages to assist in this result.

I prefer to form the flange K of the bull-ring so that it is of less diameter than the piston, so that steam may flow axially of the piston directly against the outer portion of the ring E, thereby crowding the three rings together and against the wall $m$ of the bull-ring, thus preventing leakage of steam around the inner or advancing side of the packing and thence to the opposite side of the piston. The piston is guided by the middle part of the bull-ring between its grooves D' D', which closely fits the cylinder.

In those pistons in which the piston flange and follower are relied upon to guide the piston, and hence make so close a fit with the cylinder-wall that insufficient space is left between the two for free passage of steam to the packing-rings, holes may be formed in the piston flange and follower, so as to communicate with the passage J. Such a construction is shown in Fig. 3, where the holes are designated by the letter $i$. In this construction the steam passing through holes $i$ will divide and a portion will flow outwardly and around the flange K, and thus be directed against the edge of the main ring E.

It will be understood, of course, that the description of one packing applies to both, the packings being identical, except that they are reversed or turned right for left, so that they operate alternately as the direction of movement of the piston changes.

Figure 4:
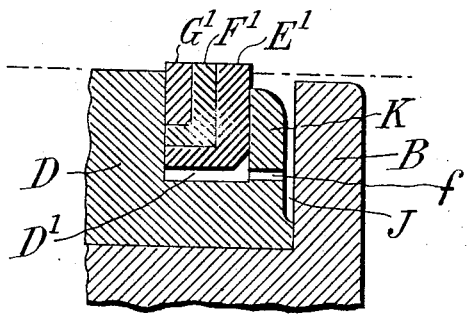
Figure 5:
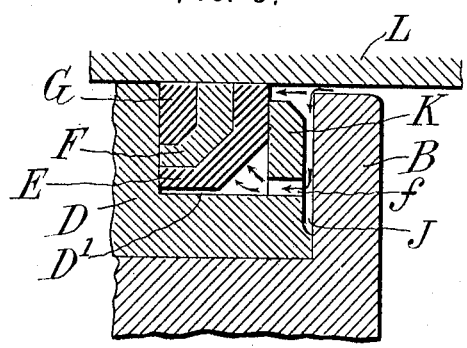

The expander H may be omitted in some cases, being used chiefly for pistons of large diameter. In Figs. 4 and 5 are shown two forms of packing wherein the expander is not used. In Fig. 5 the rings E F G are of the same shape as in Figs. 1 to 3, the only difference being in the omission of the expander and a corresponding change in the shape of the grooves or annular recesses in the bull-ring, the annular face $d$, Fig. 1ª, being omitted. This figure shows at L a fragment of the cylinder-wall, so as to show approximately the relation of the parts when the piston is in place. In Fig. 4 the outer ring, here lettered E', has its radial and inner flanges meeting at right angles, so that it is true L shape in cross-section, the intermediate ring F' being of like shape and the inner ring G' being rectangular in cross-section, so as to fill the rabbet in the ring F'.

My packing as thus far described may be made either as a segmental or sectional packing or as a continuous or split-ring packing. I prefer to make it as a split-ring packing, each ring being split or cut radially at one point in its circumference and the three rings assembled so that their splits are staggered so as to come at different points, and thus reciprocally close one another, being arranged, preferably, one hundred and twenty degrees apart. Thus, as shown in Fig. 2, the split in the outer ring E comes at 1, that in ring F at 2, and that in the ring G at 3. For a segmental ring-packing each ring will be cut through at one, two, three, or more points and arranged together so that the splits or joints in the successive rings are out of coincidence. For example, if each ring is cut in three places, with the cuts one hundred and twenty degrees apart, they are placed together so that the cuts in the middle ring will be midway between the cuts in the outer and inner rings. In the case of either split or segmental rings the rings are provided with suitable stops for preventing their becoming displaced circumferentially. For this purpose the construction shown at the left in Fig. 1 may be used, where the section is through the split in the middle ring and the outer and inner rings have pins $n$ $o$ entering the split in the middle ring.

The mechanical construction of my packing in its several preferred forms being now understood, I will proceed to explain some features which are peculiar to my invention.

It is requisite that any packing to make a steam-tight joint shall make a close fit not only on its outer face against the cylinder wall, but on its advancing face against the wall or shoulder of the piston, which I have designated as the wall $m$, (its advancing face in an engine is of course the following face in a pump, it being in any case the face of the packing-rings opposite to the side against which the fluid pressure acts.) It is also necessary to confine the packing-rings in a groove or annular recess which should make a close enough fit with them to avoid looseness or rattling and yet cannot make a steam-tight fit, since this would involve such friction as to prevent the free play of the rings outwardly or inwardly, this free play being necessary in order that the rings may adapt themselves to any slight inequalities in the cylinder-wall. It is also necessary that the rings be sufficiently flexible to be able to adapt themselves to these inequalities, it being understood that an engine-cylinder is rarely perfectly true. In order that the rings may mutually cover each other's cuts or splits, it is necessary that each ring have a flange or working face extending outwardly into contact with the cylinder and another extending into contact with the wall $m$. Commonly two rings are employed, one L-shaped and the other filling the rabbet of the L, so as to conform to these conditions. Commonly also springs are applied to press out the rings. This is necessary in segmental rings and is often used with split rings in order that such internal springs may reinforce their natural expansive tendency due to their being turned slightly larger than the cylinder and contracted in being introduced into the latter. Such springs, however, are useful mainly in maintaining an initially-tight joint with the cylinder at the beginning of the stroke, since when the fluid-pressure enters it ordinarily expands the rings with a much greater force than that which can be applied by such springs. Obviously the expansion of the rings by steam-pressure admitted within them in addition to any spring expansion generates friction between the rings and the cylinder-wall, which tends to cause the rings to lag, so that the piston has to push them forward. If such lagging occurs, then the steam can freely leak from within the rings outward between their advancing faces and the wall $m$ and thence around the piston to its opposite side. This lagging can be prevented by uncovering so large an area of the rings to the action of the fluid-pressure that the latter tends to press the rings forward in advance of the piston. This forward tendency, however, by pressing the rings strongly against the wall $m$ creates a friction against this wall which tends to resist the expansion of the rings by pressure acting internally. Hence piston-packings are more or less defective in that either there is an excessive internal pressure expanding the rings so strongly against the cylinder as to cause them to lag, and thereby leak past their advancing faces, or there is an excessive axial pressure pressing the rings forward so much in advance of the piston as to crowd their advancing faces against the wall $m$ and generate such friction as to impede their expansion, and thereby cause them to leak around their outer faces. An important object of my present invention is to overcome both these disadvantages. To this end my invention provides that the outer ring E (being the one which first receives the fluid-pressure) instead of being wholly inclosed within the groove or annular recess in the piston or being, on the other hand, widely exposed on the side toward the fluid-pressure is exposed on this side to an extent sufficient only to press the rings up snugly against the wall $m$, while at the same time a substantially equal and simultaneous fluid-pressure is admitted within the rings to exert an outward pressure, expanding them to a close fit with the cylinder. This I accomplish by forming the flange K, which confines the rings and forms one side of the annular groove or recess in which they are held, with a diameter smaller than the main or guiding portion of the bull-ring (or than the piston-flanges B C, if these latter form the guiding portions,) thereby exposing a sufficient area around the exterior of the outer face of the ring E to press the rings snugly together and to a close fit on their advancing faces with the wall $m$ without cutting away this flange to so small a diameter as to expose so wide an area of the rings to the action of fluid-pressure as to crowd the rings so tightly against the wall $m$ as to generate an obstructive friction, and I afford free communication for fluid under equal pressure to the rings—that is, to the annular chamber at the bottom of the groove or annular recess D'—so that the same pressure is applied simultaneously to force forward the rings to a close fit and to expand them to a close fit. The exact proportions that will give the best results depend upon the fluid-pressure and the piston speed; but the proportions shown in the drawings are adapted to a great majority of cases. The action may be well understood from Fig. 5. For example, when steam or other fluid at the right of the piston enters between the flange B and the cylinder, as shown by the arrows, into the space or chamber J (or it might enter this chamber through holes $i$, as in Fig. 3) and from this chamber J it flows in two directions—first, into the annular space or chamber around the flange K, wherein it presses in a direction parallel to the axis of the cylinder against the outer or exposed part of the ring E, thrusting it forward, as indicated by the arrow, and, second, through the holes $f$ into the annular space or chamber D' within the rings, wherein it presses outwardly against them. The action of the steam in these two directions is so balanced and occurs so nearly at the same instant that at each stroke the rings, which already are in mechanical contact with the wall $m$ and the cylinder-wall, are gently but firmly pressed into steam-tight contact with these walls, the axial pressure being sufficient to urge the rings forward at least as fast as the piston, so that there can be no lagging and the internal pressure being sufficient to press them outwardly strongly enough to overcome all friction generated against the wall $m$. This feature of my invention is applicable with either split rings or segmental rings and whether the expander H be employed or not. It is also applicable without regard to the number of rings employed in the packing—as, for example, I may, as shown in Fig. 6, employ a two-ring packing, the rings $E^2$ $F^2$ being in themselves of old and common construction, but being used in connection with the reduced flange K and communicating chamber J, already described, or I may employ four rings nested together, as shown in Fig. 7, in place of three. The construction shown in Fig. 8 is also within my invention, wherein the chamber J is modified by forming the bull-ring with its flange K undercut at $D^2$ and with radial communicating ports $f'$ through it.

I will now proceed to describe a feature of my invention which is applicable in connection with split-ring packings. In these packings it is customary to turn the packing-rings to a larger diameter than that of the cylinder in which they are to be used and after splitting them at one point by cutting out a piece of sufficient width to spring the rings into the cylinder. The effect of this with a single ring is shown to a somewhat exaggerated extent in Fig. 9. Here a ring G is sprung into a cylinder L. It is found that such a ring in being contracted to a smaller diameter does not contract uniformly. Its ends $q$ $q'$ close to its split necessarily bear outwardly against the cylinder, as does its diametrically opposite portion $r$, and the bearing of the ring near $r$ is extended for a considerable distance to the right and left of this point, the exact distance varying somewhat according to circumstances, but extending ordinarily about sixty degrees each side of the point $r$ and as far approximately as the points $t$ $t'$. The portions between $t$ and $q$ and between $t'$ and $q'$ are more or less out of contact with the cylinder, conserving in a greater degree their original curvature, so that between them and the cylinder are left crescent or meniscus shaped spaces $u\ u'$, which, as stated, are considerably exaggerated in width in Fig. 9. The meniscus-shaped spaces $u\ u'$ occupy each approximately a third of a circle, or one hundred and twenty degrees, while the concentric or bearing portion $t\ r\ t'$ occupies approximately one hundred and twenty degrees. This is the condition before fluid-pressure is brought to bear upon the packing, so that with a single ring-packing having its split closed or bridged in any way the packing before admitting steam or fluid pressure is not tight, as the fluid can freely flow through the meniscus spaces $u\ u'$. Such packings have been rendered tight by availing of fluid-pressure acting upon an external flange or lip or acting within the ring to press the ring out to a true fit with the cylinder. It is, however, disadvantageous to have the ring initially wanting in a leak-tight fit. If at the instant of admitting fluid-pressure this pressure enters the meniscus spaces $u u'$, it acts externally to press the ring in and opposes the internal pressure seeking to press the ring out. Where two or more rings are applied turned to bring their splits non-coincident, this disadvantage incident to the spaces $u u'$ is diminished. Two rings have been used with their splits diametrically opposite, in which case the bearing portion $t\ r\ t'$ of each covers a portion of the meniscus-shaped leak-spaces of the other; but since the bearing portion extends only about sixty degrees to either side there remains about sixty degrees of the meniscus-shaped spaces which are initially uncovered. By the use, however, of three rings arranged, as already described, with their splits one hundred and twenty degrees apart (see Fig. 2) it is evident that the bearing portion $t\ r\ t'$ of the first ring may cover and close one of the meniscus-shaped spaces $u u'$ of the second ring and the bearing portion of the latter may cover and close the meniscus-shaped space of the third ring, so that by their combination the three rings are made initially a tight fit around the circumference of the cylinder. In addition, by the use of essentially L-shaped rings nested together the inner flange $b$ of the outer ring by entering within the middle ring and the corresponding flange of the latter by entering within the inner ring serve to constrain and force them as nearly as possible to a true circle. This effect is shown in Fig. 10, which contains the same element of exaggeration as Fig. 9. Here the three rings E F G of Fig. 5 or E' F' G' of Fig. 4 are shown sprung into the cylinder, the view showing the advancing side or face of the rings. Their splits are at 1, 2, and 3, respectively, one hundred and twenty degrees apart. The inner flange $b$ of the first ring E coming within the middle ring F forces the latter out, and the flange of the latter forces the third ring G out. As the portion $t\ r\ t'$ of the first ring is concentric with the cylinder, it forces the contacting portion of the second ring to concentricity and eliminates its meniscus-shaped space, and this ring in turn has the same action upon the third ring G, so that the three rings are concentric from the points 2 to 3. From 3 to 1 the middle ring F is concentric, and this forces the corresponding portion of the third ring G into concentric form. From 1 to 2 the third ring G is itself concentric. Hence the ring G is concentric and makes an absolute fit with the cylinder for its entire circumference, the ring F is concentric and makes such a fit for two-thirds of its circumference, and the ring E is concentric for one-third of its circumference. The result is that the rings make a substantially leak-tight fit before being expanded by fluid-pressure.

It will be understood that the part herein described as a "follower" (and so termed in the art) is essentially a flange upon the piston and corresponds in its functions to the flange B. The term "flange" in the claims is hence to be understood as covering a follower or similar member when used as herein set forth.

It will be understood that the proportions of parts according to my invention may be greatly varied. In order to show the rings clearly, I have illustrated them of a cross-section much larger in proportion to the diameter of the piston than would ordinarily be preferable.

I claim as my invention in a piston-packing the following-defined novel features, substantially as hereinbefore specified, namely:

1. The combination of a piston having a flange, a bull-ring having a flange next said piston-flange, and packing-rings carried by said bull-ring, one of said flanges having an annular recess opposite the other of said flanges, communicating with the inner face of said packing-rings, and said piston-flange formed to permit passage of steam to said recess.

2. The combination of a piston having a flange, packing-rings, and a bull-ring carrying them, said bull-ring having a flange at its end, and an annular recess formed on the outer face thereof, communicating with the inner face of said packing-rings, and said flange formed to permit passage of steam to said recess.

3. A piston-packing comprising a plurality of expansible rings adapted collectively to make leak-tight contact on their outer faces against the cylinder, and on their advancing faces against a wall of the piston, the piston having an annular recess for said rings with an outer retaining-flange of diameter enough less than the cylinder to expose a sufficient area of the outer ring to the steam to press said rings forward to a steam-tight joint against said wall, and steam-admission ports to the annular chamber within said rings, whereby steam entering said chamber presses the rings out against the cylinder.

4. A piston-packing comprising at least three split expansive rings, the outer faces of said rings contacting against the cylinder, and their advancing faces contacting against a wall of the piston, said rings having flanges entering one within another, and having their splits spaced approximately equidistantly around the circumference.

5. A piston-packing comprising at least three split expansive rings, the outer faces of said rings contacting against the cylinder, said rings having flanges entering one within another, and having their splits spaced approximately equidistantly around the circumference, two of such rings adapted to force the third ring into concentric relation with the cylinder, whereby the leak-spaces exterior to the individual rings are stopped by the other rings, and the third ring is forced out to an initially-tight fit with the cylinder.

6. A piston-packing comprising three split expansive rings, the outer one L-shaped and adapted to receive steam-pressure on its inner flange, the middle one L-shaped, and nesting within the outer one, and the inner one nesting within the middle one, and having their splits spaced approximately equidistantly around the circumference.

7. The combination of a piston, a packing carried thereby, and an annular expander loosely held on said piston and having a tapering face, and movable axially to elastically press said packing outwardly.

8. The combination of a piston, a packing carried thereby, an expander within said packing, and springs pressing said expander axially to keep it in engagement with the packing.

9. The combination of a piston, a bull-ring carried thereby, a packing carried by said bull-ring, said bull-ring and packing having oppositely-inclined bearing-faces, an expander having faces acting against said bearing-faces on the bull-ring and packing, and springs pressing said expander axially into engagement with said inclined faces.

10. The combination of a piston having a flange, a packing carried by said piston, and an expander inwardly of said flange movable axially to press said packing outwardly, said piston having a passage establishing communication between the interior of the cylinder and said expander, whereby fluid-pressure may act against the latter.

11. The combination of a piston A having a flange, a bull-ring D having a groove D', a packing in said groove comprising a main ring E, and supplementary rings F and G, an annular expander H, and springs I adapted to force said expander against said packing.

12. The combination of a main ring having a radially-extending body and an inner axially-extending flange, and a supplementary ring composed of a plurality of individual continuous rings supported by said flange and adapted to be pressed outward by the expansion of said main ring.

13. The combination of a main ring having a radially-extending body and an inner axially-extending flange, and a supplementary ring composed of a plurality of individual continuous rings supported by said flange and adapted to be pressed outward by the expansion of said main ring, the bearing-faces of said main ring and each of said individual rings being of the same width.

14. The combination of a main ring having a radially-extending body and an inner axially-extending flange, and a supplementary ring composed of a plurality of individual continuous rings supported by said flange and adapted to be pressed outward by the expansion of said main ring, the bodies of said main ring and each of said individual rings being of the same width, and means for admitting steam under the flange of said main ring, whereby each ring is subjected to the same expansive pressure.

15. The combination of a main ring having a radially-extending body and an inner axially-extending flange, and a supplementary ring composed of a plurality of individual continuous rings supported by said flange and adapted to be pressed outward by the expansion of said main ring, each of said rings having a subdividing-slit and the slit of each ring being staggered in position relatively to that of the adjacent ring.

16. The combination of a main ring having a radially-extending body and an inner axially-extending flange, a second ring supported on said main-ring flange and having an inner flange, and a third ring supported on the flange of said second ring.

17. The combination of a piston, a bull-ring having a packing-ring groove and a packing in said groove comprising a main ring having a radially-extending body and an inner axially-extending flange, and a plurality of individual rings supported by said flange and adapted to be pressed outward by the expansion of said main ring.

In witness whereof I have hereunto signed my name in the presence of two subscribing witnesses.

WILLIAM H. MYERS.

Witnesses:
EUGENE V. MYERS,
THOMAS F. WALLACE.